Dec. 6, 1966 G. KITTREDGE 3,289,818
CONVEYOR FOR HANDLING UNIT LOADS
Original Filed July 29, 1963 6 Sheets-Sheet 1

INVENTOR.
GIFFORD KITTREDGE
BY
ATTORNEY

Dec. 6, 1966  G. KITTREDGE  3,289,818
CONVEYOR FOR HANDLING UNIT LOADS
Original Filed July 29, 1963  6 Sheets-Sheet 4

INVENTOR.
GIFFORD KITTREDGE
ATTORNEY

Dec. 6, 1966          G. KITTREDGE          3,289,818

CONVEYOR FOR HANDLING UNIT LOADS

Original Filed July 29, 1963          6 Sheets-Sheet 5

FIG. 10

INVENTOR.
GIFFORD KITTREDGE
BY
ATTORNEY

Dec. 6, 1966  G. KITTREDGE  3,289,818
CONVEYOR FOR HANDLING UNIT LOADS
Original Filed July 29, 1963  6 Sheets-Sheet 6

INVENTOR.
GIFFORD KITTREDGE
BY
ATTORNEY

United States Patent Office 3,289,818
Patented Dec. 6, 1966

3,289,818
CONVEYOR FOR HANDLING UNIT LOADS
Gifford Kittredge, Wilmette, Ill., assignor, by mesne assignments, to Unarco Industries, Inc., Chicago, Ill., a corporation of Illinois
Continuation of application Ser. No. 298,330, July 29, 1963. This application July 16, 1965, Ser. No. 480,542
33 Claims. (Cl. 198—190)

This invention relates to conveyors and more particularly to conveyors of the type where unit loads are to be conveyed and where the load size can be predetermined.

This application is a continuation of Serial No. 298,330 filed July 29, 1963, by Gifford Kittredge and entitled "Conveyor For Handling Unit Loads," now abandoned.

Conveyors having a wide flat belt have been known and used for many years in a wide variety of materials handling applications. However, conveyors of this type have not been entirely satisfactory for some applications. For example, their installation requires considerable vertical space to provide adequate room for the return run of the belt as well as room for the necessary conveyor driving mechanism. Moreover, in some installations moving parts, such as idler pulleys, must be left exposed to permit easy access for repair and maintenance and this can be dangerous.

Furthermore, it is impossible for a wide flat belt to traverse lateral curves, and if other than straight runs must be made in the conveying system, separate and complete conveyor units must be provided sometimes with intermediate transfer means to move the load from one conveyor to the other. Also, if it is desired to convey a load up or down an incline, the transition from the horizontal to the incline is somewhat difficult with the wide belt type conveyor because the tension in the drive run of the belt will tend to force the belt to ride up at the point of transition. Therefore, means such as pulleys must be provided to guide the drive run of the belt along the desired path or, separate conveyors must be used, one for the horizontal run and the other for the inclined run.

Another disadvantage to their use is that the wide flat belts are difficult to install and remove for cleaning purposes, maintenance or for replacement. In most industrial conveyors, the belt must be laced and spliced for ease of removal. Spliced belts are not as strong as vulcanized, endless belts and, of course, are not as sanitary. But in cases where the belt is vulcanized endless, the conveyor must be partially disassembled in order to remove the belt, and this obviously is not desirable.

Conveyors of the wide flat belt type are also commonly used in restaurants, cafeterias, hospitals, etc., to carry trays or boxes containing dirty dishes back to the kitchen for washing. These conveyors are also used, for example, in hospital kitchens to slowly move trays along a line of workers making up a meal on each tray. All conveyors used around eating establishments or where food is prepared must be constructed according to rigid sanitary standards, and therefore such conveyors conventionally utilize an endless flat belt running on top of a stainless steel table with the return run of the belt beneath the table. Since the belt is returned beneath the table, food particles adhering to the belt are apt to drop off beneath the table creating an unsanitary condition unless the conveyor is frequently inspected and cleaned which is difficult and inconvenient with conveyors of this type.

Food particles can also gather between the wide flat belt and the table creating an unsanitary condition that is hidden from view by the belt itself. Moreover, since the belt is usually laced and spliced for easy removal, the splice forms a pocket that catches food particles. This also can cause an unsanitary condition, and due to the action of greases, liquids, etc. that will accumulate in the splice over a period of time, the exposed ends of the belt at the splice will deteriorate and shorten the life of the belt.

Furthermore, it is commonly known that laced splices are the weakest point of a loop of belting, and therefore if it were practical to eliminate the splice from an ease of installation standpoint, lighter weight belting could be used to carry the same loads previously carried on heavier belting.

As previously mentioned, it is practically impossible for conveyors using a flat wide belt to traverse lateral curves. In some material handling applications, it may be necessary or convenient to convey the loads around curves. If so, it is usually essential that the loads be maintained level to minimize the chances of toppling and possible damage to the loads. In food service conveyors, the use of more than one conveyor to negotiate a lateral curve adds expense as well as creating unsanitary pockets around the additional pulley mechanism required. If needed, transfer tables used at the curves add even more to the cost and complexity of the system and, in addition, make the conveyor more difficult to design in accordance with sanitary standards.

Where long belt conveyors with a pan-type construction are involved, they require drives that are quite powerful and are therefore bulky and expensive. This is particularly a problem with conveyors of this type when used in food service applications since the belt is supported directly on the stainless steel table for sanitary reasons, and the belt may cling to this table when moisture is present. This problem can be illustrated by drawing a damp cloth across a smooth, wet surface.

It is therefore a principal object of my invention to provide an improved conveyor for the handling of unit loads.

It is another object of my invention to provide an improved endless belt-type conveyor that is very compact in design and therefore requires relatively little space in vertical height and is also suitable for counter-top installations.

It is a further object of my invention to provide an improved belt-type conveyor that is extremely safe for those operating it or working around it since all the moving parts are contained in the head and tail assemblies, the intermediate section having no moving parts other than the conveyor belts themselves.

It is a still further object of my invention to provide an economical belt-type conveyor that is much less expensive than conveyors of the prior art used in similar applications. The novel conveyor of my invention is economical in that the belts themselves are less expensive as well as the associated components which can be smaller and lighter because the belt is easier to drive and requires less power. Also, the conveyor is less expensive to operate and to maintain.

It is another object of my invention to provide an improved belt-type conveyor that will easily traverse lateral curves without the need for transfer tables or separately powered conveyors.

It is another object of my invention to provide an improved belt-type conveyor that can easily make the transition from a horizontal run to an inclined run without being separated into two units or without the need for complicated and expensive snubbing equipment.

It is a further object of my invention to provide an improved belt-type conveyor which uses an endless belt that can be easily removed and installed and contains no splice that weakens the belt and provides a spot where deterioration can begin.

It is a still further object of my invention to provide an improved belt-type conveyor that is of a sanitary design and therefore suitable for food service applications and the like. My novel conveyor meets the highest standards of sanitary design and is much easier to inspect, clean and keep clean than conveyors of the prior art.

It is a still further object of my invention to provide an improved belt-type conveyor in which both the drive run and the return run of the conveyor belt are above the table and therefore are easily inspected and cleaned.

It is another object of my invention to provide a conveyor that occupies less space, is lighter in weight and is capable of being used over long runs without the need for intermediate drives or friction reducing supports. The conveyor is therefore much easier to install and is much more readily adaptable to a wider variety of situations.

These and other objects of my invention will be readily apparent from a consideration of the following description taken in connection with the accompanying drawings in which.

Figure 1:
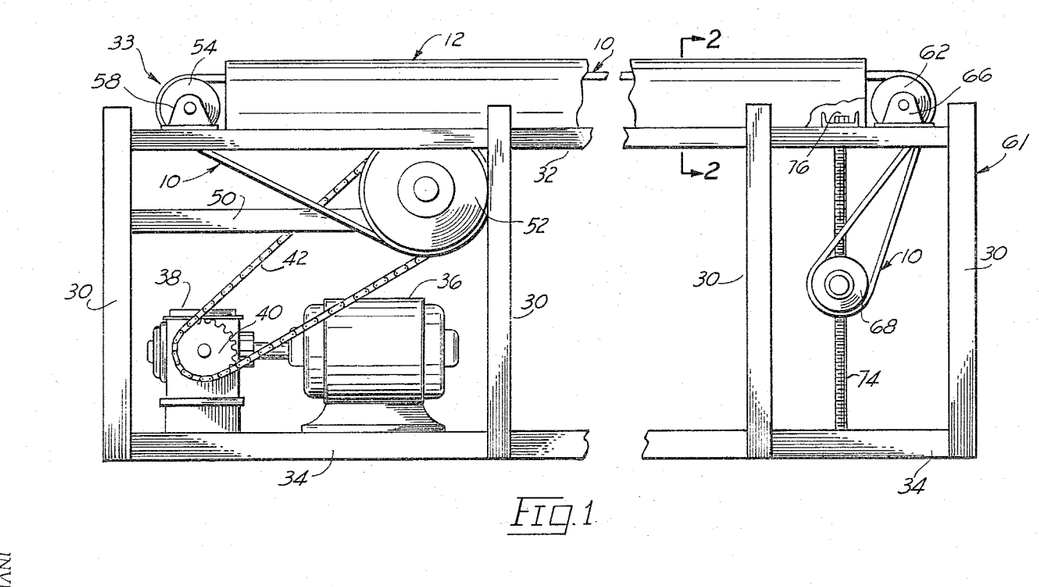
FIG. 1 is a side elevation view of a conveyor constructed according to my invention and showing in elevation the head and tail assemblies.
Figure 2:
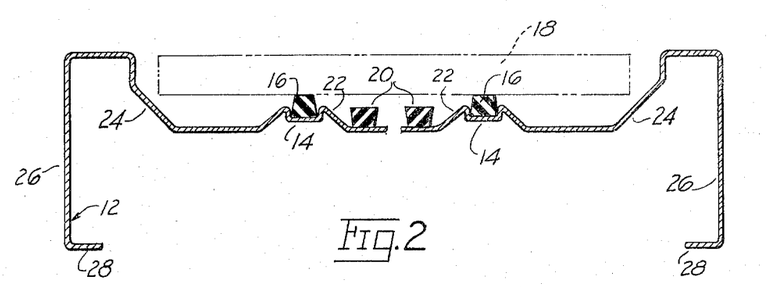
FIG. 2 is a sectional view taken on the line 2—2 of FIG. 1 and showing the construction of the table on which the conveyor belts run.

Referring now to the drawings, particularly FIGS. 1–4, the conveyor of my invention has a pair of spaced-apart narrow belts 10 supported by and running on the top surface of a table 12 which may be formed to the cross-sectional shape shown in FIG. 2. The table 12 as shown in FIG. 2 is generally flat and has formed therein two parallel spaced-apart tracks 14 each having a width slightly larger than the widest portion of the belt 10. The tracks 14 are shown as formed integrally with the table 12, but it should be understood that tracks 14 could be made separately and then affixed to the table 12 in any suitable manner, such as by welding. The tracks 14 could be made, for example, from standard channels fixed to a flat sheet of metal.

The tracks 14 provide a running surface for the carrier runs 16 of the belts 10, this running surface being slightly above the general elevation of the table 12. This slight elevation of the carrier runs 16 is necessary since the return runs 20 of the belts 10 are also on top of the table 12, and the carrier runs 16 must be able to directly engage a unit load 18 (indicated by the dotted line in FIG. 2) without interference by the return runs 20. The return runs 20 may be carried on table 12 either outside or inside the carrier runs 16, the latter being shown with the return runs riding on the general surface of the table 12.

The belts 10 may be formed of any one of several cross-sectional shapes, but I have elected to use, and have shown by way of example, belts of the shape illustrated, which are standard V-belts. Belts of a circular cross-section or of any polygonal cross-section can also be used, but the standard V-belt, which is really trapezoidal in cross-section, is readily available commercially without special order.

When using V-belts, the return runs 20 run in the normal position with the wider surface of the belt uppermost, but the carrier runs 16 are inverted with the wider surface lowermost and with the narrow surface of the belt on top engaging the unit load 18. This is done for reasons that will become apparent from further description of the conveyor. Also, when using V-belts, I prefer to provide sloping shoulders 22 along the edges of the tracks 14 to assist in guiding the return runs 20. The table 12 is also provided with upwardly extending side walls 24 that serve as guides for the unit loads 18. These side walls 24 may be formed with sloping sides as shown in FIG. 2 where the conveyor is to be used in food service applications since this eliminates the sharp corners which are undesirable from a sanitary standpoint. Large radius "cove corners" can also be used.

In the illustrated embodiment, the table 12 is supported on and affixed to the conveyor frame work. Therefore, the table is provided with downwardly extending exterior side walls 26 which have an inwardly turned horizontal flange 28 at the lower edge to facilitate securing the table 12 to the conveyor frame work. However, it should be understood that the conveyor table 12 could be supported in many different ways, and it might in some cases be desirable to suspend it from above.

When used in food service applications, the table 12 of the conveyor should be made from stainless steel. However, for industrial applications any suitable material can be used as well as stainless steel.

My invention is not particularly concerned with the specific construction of the supporting frame work for the conveyors since this can be made in any suitable manner and will generally depend upon the particular layout and construction of the facilities where the conveyor is installed. One possible arrangement is shown in FIGS. 1 through 4, this arrangement consisting of a series of vertical upright members 30 connected to upper and lower horizontal members 32 and 34, respectively. The table 12 is mounted on and secured to the upper horizontal members 32.

Figure 3:
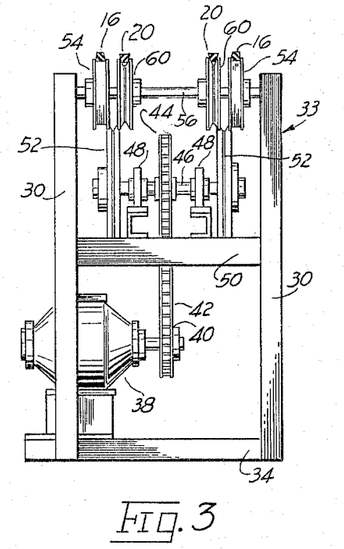
FIG. 3 is an end elevational view of the head assembly looking at the assembly from the left of FIG. 1.

The head assembly 33 of the conveyor shown in FIGS. 1 and 3 contains the conveyor driving mechanism which includes a motor 36 of suitable type and size mounted on the lower horizontal supporting members 34. The motor 36 through a gear box 38 rotates a drive sprocket 40 at the desired speed. A chain 42 interconnects the drive sprocket 40 with a second driven sprocket 44 that is secured to a shaft 46 turnable in bearings 48 which are mounted on intermediate support bars 50. The driven sprocket 44 is mounted on the shaft 46 between the bearings 48. A pair of main drive sheaves 52 are also rotatable with the shaft 46, a sheave 52 being secured to the shaft 46 at each of its outer ends outside the bearings 48, as best seen in FIG. 3. As will be described more fully hereinafter, this facilitates installation and removal of the belts 10. Each of the main drive sheaves 52 has a V-shaped groove therein adapted to engage the return run 20 of the belts 10. Of course, if a belt of different cross-sectional shape is used the sheaves 52 should be grooved to correspond to the particular shape of the belt used.

The return run 20 of each belt 10 passes around a main drive sheave 52 and then follows a horizontal path toward the end of the conveyor where it engages an idler sheave 54. The idler sheaves 54 are affixed to a shaft 56 secured to a pair of bearings 58 mounted on the upper horizontal members 32. The main drive sheaves 52 are shown in FIG. 1 to be positioned inside (to the right in FIG. 1) the idler sheaves 54. This is done to conserve space, but it should be understood that the relative location of the sheaves 52 and 54 should be determined by the space available in the particular installation, and if necessary, the drive sheaves 52 could be located outwardly from the idler sheaves 54.

As shown in FIG. 3, each of the idler sheaves 54 is formed with a rectangular groove instead of a V-groove. This is done because the belts 10 will now be serving as the carrier runs 16, which run on table 12 in an inverted position with the narrow surface as the upper surface.

The return runs 20 of the belt 10 are returned from the drive sheaves 52 to top of table 12 via a pair of idler sheaves 60 that are also secured to and rotate with a shaft 56 in the head assembly 33 of the conveyor. Note that the idler sheaves 60 each contain a V-shaped groove since the return runs 20 of the belts 10 ride on top of table 12 with the wider surface on top.

The construction of the head assembly 33 described above is such that the belts 10 can be vulcanized endless, thus eliminating splicing. This has certain advantages since belts that have to be spliced are somewhat weaker and the splice tends to pick up foreign matter which causes deterioration of the belt as well as creates an unsanitary condition if the conveyor is being used in a food service installation. Even though the belts 10 are endless, my novel conveyor design permits the belts to be easily installed and removed for cleaning, maintenance or for replacement. Note the construction and relative positioning of the sheaves 52 and sprocket 44. The drive sheaves 52 are mounted at the free ends of the shaft 46 which permits the endless conveyor belts 10 to be slipped off the ends of the shaft 46 without disassembly of any portion of the conveyor. This construction is a great advantage over prior art construction in which the belt must either be spliced or if made endless the conveyor must be partially disassembled in order to remove the belt and replace it.

Figure 4:
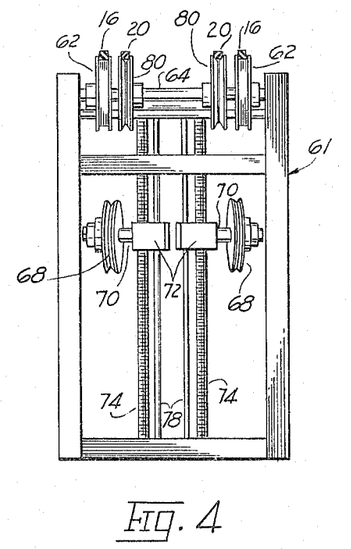
FIG. 4 is an end elevational view of the tail assembly looking at the conveyor from the right of FIG. 1.

The tail assembly 61 of the conveyor is illustrated in FIGS. 1 and 4 and contains the necessary arrangement to convert the return runs 20 of the endless belts 10 into the carrier runs 16 and guide the latter back to the top of table 12. The return runs 20 of the belts 10 pass from the top of table 12 into the tail assembly 61 around a pair of idler sheaves 80 that are secured to a shaft 64 turnable in bearings 66 which are mounted on the upper horizontal members 32 at the tail end of the conveyor. The return runs 20 of the belts 10 follow paths around a second pair of sheaves 68 each secured to a short stub shaft 70. Each of the shafts 70 is rotatably supported in a bearing block 72 which is adjustably mounted on a vertical threaded rod 74 that is secured between the upper and lower horizontal members 32 and 34. Each of the threaded rods 74 has a head portion 76 (FIG. 1) that can be gripped by a wrench or other suitable tool to turn the rod 74. When the rod 74 is turned, the respective bearing block 72 will be moved up or down since each block 72 is integrally threaded and held from rotation by a guide rod 78 which also extends through the block 72 parallel to rod 74. This construction permits individual movement of the sheaves 68 to facilitate installing or removing the belts 10 and also provides for adjustment of the tension in the belts 10. Note that the sheaves 68 are cantilevered on shafts 70 so that the belts 10 may be removed from the sheaves 68 without disassembly of any of the components of the tail assembly. All that is necessary to replace the belts 10 is to raise the sheaves 68 on rods 74 in order to loosen the belts 10, remove the belts and install replacements, and then by turning the rods 74 the belt 10 will be tightened.

After passing around the sheaves 68, the return runs 20 of the belts 10 become the carrier runs 16 and are returned to the top of table 12 over another pair of sheaves 62 which are secured to the shaft 64 next to the sheaves 80.

Since the adjustable take-up sheaves 68 receive the belts 10 from sheaves 80 and return them to sheaves 62 that are mounted on the same shaft 64, the belts are fed to and leave the sheaves 68 at a slight angle. Therefore, it is desirable to mount the sheaves 68 with a slight camber to compensate for the angularity of the belts. This can be accomplished by positioning the guide rods 78 slightly out of line with the rods 74. In other words, each pair of a rod 74 and a rod 78 is in a plane that is not parallel to shaft 64.

Figures 5, 6:
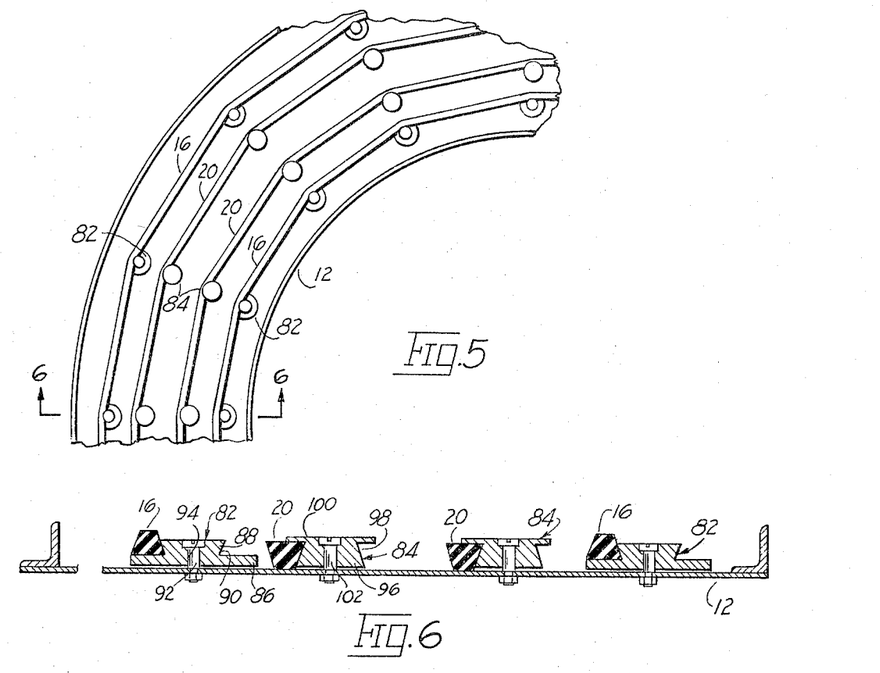
FIG. 5 is a plan view of a portion of the conveyor showing the manner in which the conveyor traverses a lateral curve.
FIG. 6 is a sectional view taken on the line 6—6 of FIG. 5.

By the description thus far, it is evident that when the belts 10 are making the carrier runs 16 the narrower surface of the belts is the top surface that engages the unit loads 18, and thus the carrier runs 16 are inverted from the position of the return runs 20. The purpose of this arrangement is for stability and to facilitate the traversing of lateral and vertical curves. As shown in FIGS. 5 and 6, these narrow belts 10 can be easily guided around lateral curves, and this is a great advantage of this conveyor over prior art constructions. In the arrangement shown in FIGS. 5 and 6, while the table 12 is shown flat this is for purposes of illustration only and obviously other constructions can be employed. There are a series of guide wheels at spaced intervals on the table 12 around the curved paths of the belts 10. Both the guide wheels 82 for the carrier runs 16 and the guide wheels 84 for the return runs are positioned radially inwardly from the belts 10 for obvious reasons. The number of guide wheels used depends upon the degree of curvature, the length of the curve, and the tension in the belts 10. The guide wheels 82 and 84 can be spaced around the curve either in an in-line or a staggered relationship.

The above design for curves makes it easily possible for the conveyor to make either climbing or descending turns. There are some applications where a spiral section of the conveyor would be extremely useful to carry loads from one elevation to another. For example, space limitations in a particular installation might be such that only a spiral would be practical. In such a case using a spiral, it might be desirable to return the belt by a more direct route than above the table along the spiral route.

As best seen in FIG. 6, each of the carrier guide wheels 82 has a circular base 86 and a central boss 88 that has inwardly sloping sides 90. Each wheel 82 is secured to the table 12 and is rotatable about a mounting screw 92 positioned in a central opening 94 in the wheel 82. As shown in FIG. 6, the carrier run 16 of the belt 10 rides on top of the circular base 86. The radial component of force exerted on the belt holds the belt in the groove provided by the inwardly sloping sides 90 of the central boss 88. This keeps the belt 10 from riding upwardly.

Each return guide wheel 84 consists of a central member 96 that has inwardly sloping sides 98 and an upper circular shaped top 100 the diameter of which is greater than the largest diameter of the central member 96. Similar to the carrier guide wheel 82, the return guide wheel 84 is held in place by a mounting screw 102 and is free to rotate about such screw. The construction of guide wheels 84 provides a V-shaped groove into which the return run 20 is biased by the radial force component. Since the top of the return run 20 is the wider portion, the belt 10 fits into the corresponding groove in the guide wheel 84, the top member 100 preventing the belt 10 from riding upwardly.

As best seen in FIG. 6, the carrier runs 16 are at a slightly higher elevation than the return runs 20. This is necessary to avoid interference between the return runs 20 and the load being carried and is provided for by running the carrier runs 16 on top of the circular base members 86 of the guide wheels 82.

The above described arrangement permits the belts 10 to go around lateral or sloping curves of any degree of curvature without riding up from the table 12 and with interference between the return runs 20 and the load being carried. With this arrangement, the conveyor can also be used in food service applications since sanitary design features have not been sacrificed. Both the carrier guide wheels 82 and the return guide wheels 84 may be designed for easy removal for cleaning.

Figure 7:
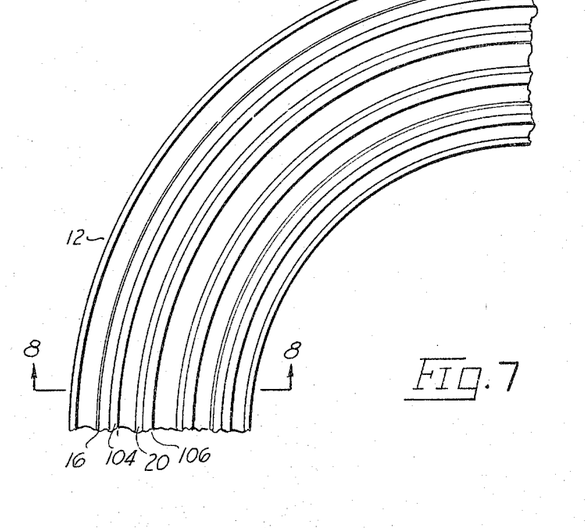
FIG. 7 is a plan view similar to FIG. 5 showing an alternate construction for the conveyor around a lateral curve.
Figure 8:
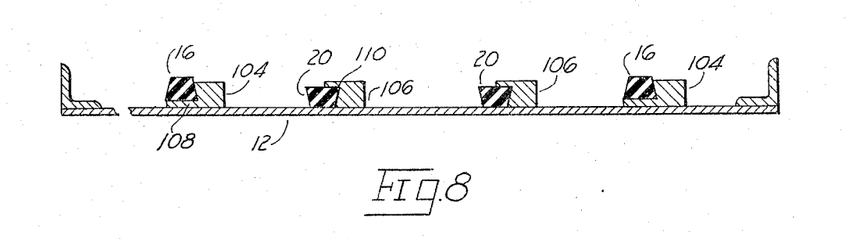
FIG. 8 is a sectional view taken on the line 8—8 of FIG. 7.

In FIGS. 7 and 8 an alternate construction for traversing lateral curves is shown. In this embodiment, the table 12 is provided with continous guide bars of the desired curvature, a bar 104 being provided for each of the carrier runs 16 and a bar 106 being provided for each of the return runs 20. The bars 104 and 106 may be affixed to the table 12 in any suitable manner such as by welding. As best seen in FIG. 8, each carrier guide bar 104 is formed with a V-shaped notch 108 opening upwardly on the radially outward side of the bar 104. Thus, the carrier run 16 of the belt 10 will ride in the notch 108 at a slight elevation above the table 12 with the top surface of the belt 10 engaging the unit load 18.

The return guide bar 106 also has a V-shaped notch 110 which, however, opens downwardly to accommodate the return run 20 of the belt 10 that rides directly on the table 12. The bar 106 serves to guide the belt 10 around the curve and hold it down against the surface of the table 12.

The guide bars 104 and 106 can be machined and then rolled to the required radius, or for industrial applications of the conveyor these bars may be extruded from aluminum or made from some suitable plastic material. If the bars are made from stainless steel and are welded continuously to a stainless steel table, the design would be sanitary and suitable for food service applications.

Figure 9:
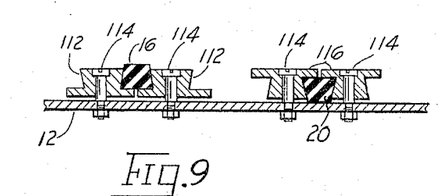
FIG. 9 is a sectional view similar to FIG. 2 but taken on an inclined run of the conveyor and showing one of the drive and one of the return runs of the belts.
Figure 9A:
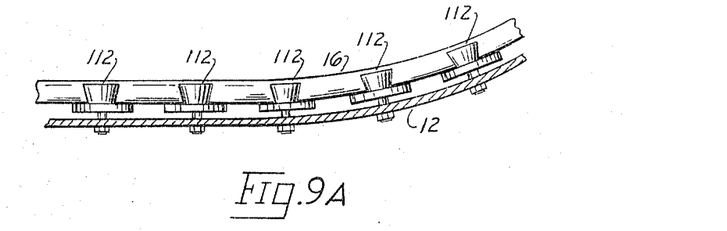
FIG. 9A is a side elevation further illustrating an inclined run.

Referring now to FIG. 9, there is illustrated a construction which makes it possible for my novel conveyor to make the transition from a horizontal run to an incline or decline. In making the transition from horizontal to incline, the carrier belt 16 tends to ride up off the table 12. When wide flat belts are used, it therefore becomes necessary to use two separate conveyors—one in each of the two different planes—or to use a pulley arrangement in between the horizontal and incline runs. With my novel conveyor such arrangements are not necessary. As illustrated in FIG. 9, the carrier runs 16 of the belts 10 are held in position by means of guide wheels 112 on each side of the belt. Each of the guide wheels 112 has sides shaped to correspond to the shape of the belt 10 and is rotatable about a mounting screw 114 which secures the wheel 112 to the table 12. Similarly, the return runs 20 are restrained by guide wheels 116 designed to handle this particular section of the belt 10. If desired, the guide wheels 112 can be provided with circular bases to elevate the carrier runs 16 off the surface of the table 12. Also, in some cases, the return runs could be made beneath the table 12.

Figure 10:
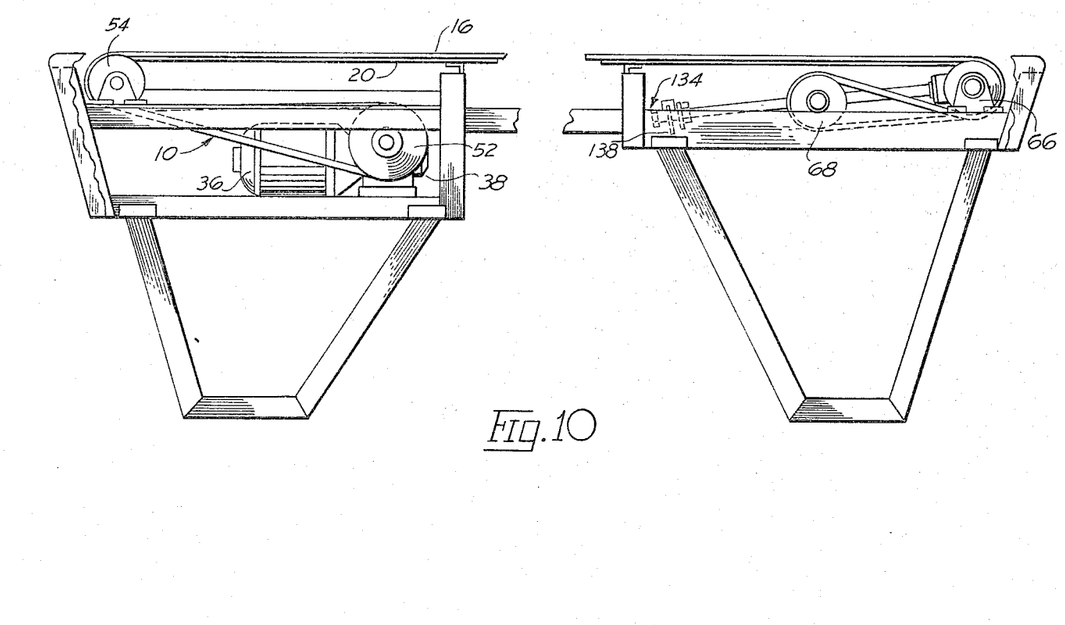
FIG. 10 is a side elevational view similar to FIG. 1 but showing an alternate method of construction of the head and tail assemblies.
Figure 11:
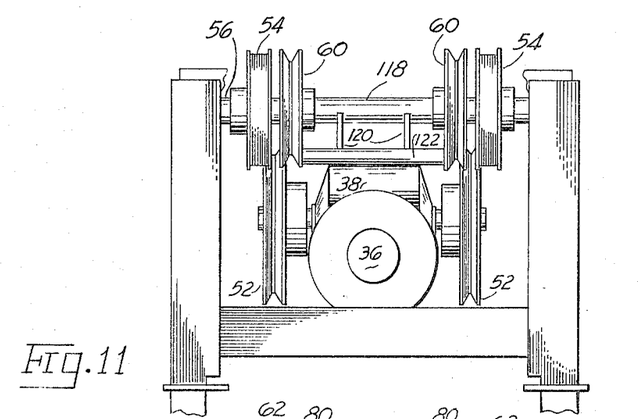
FIG. 11 is an end elevational view of the head assembly looking at the conveyor from the left of FIG. 10.

In some specific installations, certain modifications of the conveyor described above may be desirable, and I have therefore designed the conveyor shown in FIGS. 10 through 13. This construction shown is very similar to that shown in FIGS. 1 through 4, the supporting frame work being slightly different and more compact as shown. In this embodiment the motor 36 is mounted between the drive sheaves 52 and drives them directly through a gear box 38 without the necessity of the chain and sprocket arrangement of FIGS. 1 through 4. This construction is particularly adaptable to conveyors requiring a relatively small amount of power and thus using a small motor. As best seen in FIG. 11, the drive sheaves 52 are mounted outwardly from the gear box 38 so that endless belts may be easily installed and removed. In this embodiment, the motor 36, with gear box 38 carrying the drive sheaves 52 may be affixed to the supporting frame work, or they may be mounted as shown in an arrangement that permits them to be swung downwardly for better access. With this arrangement, the shaft 56 for the idler sheaves 54 and 60 is provided with a tubular member 118 that is turnable with respect to the shaft 56. Suitable bearings or other friction reducing means may be provided between the tubular member 118 and shaft 56. Rigidly fixed to the tubular member is a pair of arms 120 to which there is connected a cross member 122 and supporting rods (not shown) that are affixed to the motor 36 and gear box 38. Suitable means (not shown) is also provided to lock the motor and gear box in place when swung upwardly into the position shown in FIG. 10. When access is needed to the motor 36 and gear box 38, or if it becomes necessary to remove or install a belt, the locking means can be released and the assembly swung downwardly to provide access to the components and ease of removability and installation of belts. If desired in sanitary installations, a removable crumb drawer (not shown) can be slidably mounted underneath the entire drive assembly to catch particles of food that might drop through at this point. This drawer would also serve as an access drawer and would close off the drive assembly when in position.

Figure 12:
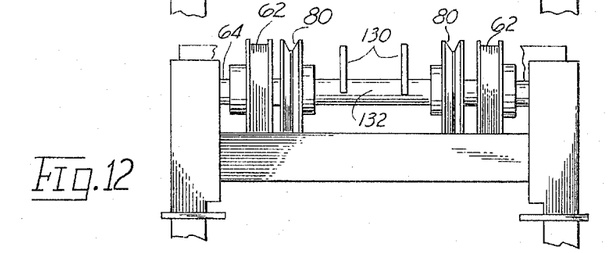
FIG. 12 is an end elevational view of the tail assembly looking at the conveyor from the right of FIG. 10.
Figure 13:
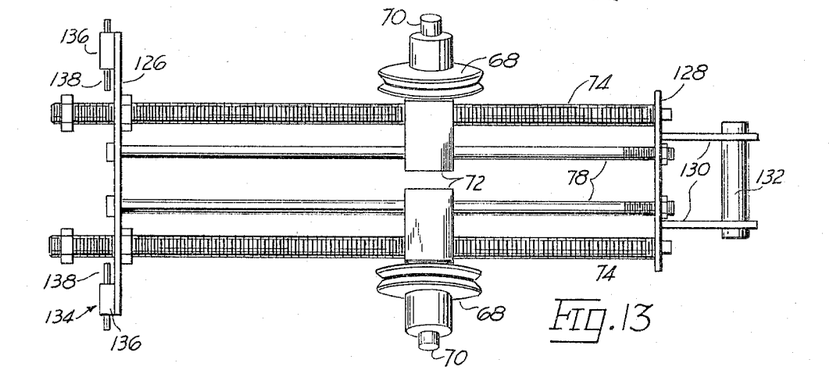
FIG. 13 is a plan view of a portion of the tail assembly showing the details of the adjustable pulley arrangement.

In the construction of the tail assembly shown in FIGS. 10 and 12, the assembly is very similar to that shown in FIGS. 1 and 4. Idler sheaves 62 and 80 are mounted on a shaft 64 which rotates in bearings 66 fixed to the supporting frame work. The other sheaves 68 are turnable on stub shafts 70 fixed in bearing blocks 72 that are adjustably mounted on threaded rods 74 and guide rods 78. Also, similar to the first embodiment, the sheaves 68 are preferably cambered to compensate for the angularity in which the belts 10 are received from and passed on to the sheaves 62 and 80. However, in this embodiment the rods 74 and 78 are not fixed to the frame work, but rather are held together by cross members 126 and 128. A pair of arms 130 extend from the cross member 128 and are affixed to a tubular member 132 into which the shaft 64 is received. The shaft 64 and tubular member 132 are turnable with respect to one another and are preferably provided with some friction reducing means between them. The assembly carrying the sheaves 68 is held in a raised position by any suitable locking mechanism one type of which is indicated generally by the reference numeral 134. The locking mechanism 134 consists of a pair of bars 136 each of which is affixed at one of the outer ends of the cross member 126. The bars 136 each contain a hole drilled through the center, and an L-shaped latching rod 138 is turnable and slidable in the hole. The latching rods 138 therefore may be withdrawn to permit the assembly to be swung into place and then pushed outwardly to engage the top of the supporting frame work and thereby keep the assembly from swinging downwardly.

The swingable take-up assembly makes the components easily accessible and permits easy removal and installation of belts. The assembly also provides an automatic belt tensioning means since the path of travel of the belt is longer when the assembly is in the uppermost position than when it is swung downwardly. Thus, if the sheaves 68 are adjusted to tighten the belts while the assembly is in a downward position, swinging the assembly upwardly will add the proper amount of tension to the belts automatically.

The construction just described for the second embodiment of my invention is particularly adaptable to installations where the ends of the conveyor are accessible. This construction can be especially used on portable conveyors.

The belts 10 for conveyors constructed according to the principles of my invention are above the table and can be easily inspected and cleaned. If desired, suitable cleaning tanks can be provided together with additional sheaves to direct the belts into and out of the tanks. The belts 10 obviously require considerably less material than a flat wide belt would require to do a comparable job. The belts are lighter and require less power to drive them and the remaining conveyor components therefore can be made of a lighter and simpler construction. This lessens the cost of the conveyor. As described, the belts can easily pass around lateral curves and up and down inclines thus eliminating the need for separate conveyor units and expensive and unsanitary transfer tables or other devices that must sometimes be used with wide belts. Of course, any number of narrow belts can be used in conveyor constructed according to my invention, the number used depending primarily on the load to be carried. The belts, of course, can be spaced-apart any distance to carry any size load, and in most instances a single pair of spaced-apart belts will be sufficient.

The space provided between the belts also makes the conveyor more easily adaptable for a variety of installations. For example, a roller or actuating arm can be provided that will project upwardly between the belts and trip a limit switch when the arm is contacted by the load being conveyed. This can be used, for example, to shut off the motor and stop the conveyor before the load would run off the end of the conveyor. Also, such actuating devices can be prvided between the belts to direct selected articles from a main conveyor to a branch conveyor. Such arrangements were not convenient with the wide flat belt type conveyor.

In between the head and tail assemblies of a conveyor constructed according to my invention, there is no necessity for any mechanism other than the table itself. This means that the conveyor can be used for countertop installations in which the space beneath the conveyor is utilized for cabinets. This is particularly useful in food service applications and is very sanitary since food particles or other foreign matter will be contained on top of the table which is easily inspected and cleaned. The table can be cleaned by merely loosening the tension in the belts by dropping the belt take-up assembly and wiping off the table beneath the surfaces of the belts. There obviously are no moving parts other than the belts themselves between the head and tail assemblies. This is a safety feature not found in conveyors of the prior art. The feature of being able to use endless, vulcanized belts and removing them and installing them without disassembly of the conveyor is also a particular advantage in conveyors of this type.

Although I have illustrated my invention only in connection with the certain embodiments it will be obvious to those skilled in the art that various revisions and modifications can be made to these conveyors without departing from the spirit and scope of my invention. It it therefore my intention that such revisions and modifications as are obvious to those skilled in the art will be included within the scope of the following claims.

I claim:

1. A conveyor for handling unit loads comprising a table extending along the desired path of travel and at substantially the desired height of the loads to be conveyed, means for supporting said table at said height, a pair of laterally spaced-apart endless narrow belts operating at substantially the same linear speed with the carrier and return runs of said belts both running above said table, means to elevate the carrier runs relative to the return runs, means at one end of the conveyor to drive said belts, and means at the other end of the conveyor to return the belts.

2. The conveyor of claim 1 in which the return runs follow paths inside the carrier runs.

3. The conveyor of claim 1 in which the belts are circular in cross section.

4. The conveyor of claim 1 in which the belts are polygonal in cross section.

5. The conveyor of claim 1 in which the belts are V-belts, having a narrow surface and a wide surface joined by sloping sides.

6. The conveyor of claim 5 in which the drive runs of the belts are made with the narrow surface uppermost, the return runs being made with the wide surface uppermost.

7. A conveyor for handling unit loads comprising a table extending along the desired path of travel and at substantially the desired height of the loads to be conveyed, means for supporting said table at the desired height, a pair of laterally spaced-apart endless narrow belts operating at the same linear speed with the carrier and return runs of said belts both running above said table, guide means on said table to guide at least one of said runs and to provide for a difference in elevation between the carrier and return runs, the carrier runs being at a higher elevation, means at one end of the conveyor to drive said belts, and means at the other end of the conveyor to return the belts.

8. The conveyor of claim 7 in which said guide means includes tracks formed integrally in the table.

9. The conveyor of claim 7 in which said guide means includes tracks separate from said table and means is provided to secure said tracks to said table.

10. A conveyor for handling unit loads and conveying said loads around lateral curves, said conveyor comprising a table extending along the desired path of travel and at substantially the desired height of the loads to be conveyed, means to support said table at said desired height, a pair of laterally spaced-apart endless narrow belts operating at substantially the same linear speed above said table to engage said loads, guide means combined with said table around the curve radially inwardly from said belts, said guide means exerting a force downwardly to maintain said belts on said table, and means to provide for linear movement of said belts around the curve.

11. The conveyor of claim 10 in which both the return runs and carrier runs are above the table, and the guide means for said carrier runs has a portion engaging said belts below the uppermost surface of the belts.

12. The conveyor of claim 10 in which the guide means is a plurality of wheels affixed to said table at spaced points along the arc of said curve, each of said wheels being turnable on an axis substantially perpendicular to said table.

13. The conveyor of claim 12 in which said guide wheels are removably affixed to said table.

14. The conveyor of claim 10 in which the guide means is a continuous track following the arc of the curve radially inwardly from said belts.

15. The conveyor of claim 11 in which the guide means for said carrier runs has a portion elevating said carrier runs relative to the return runs.

16. The conveyor of claim 12 in which the guide wheels for the carrier runs and return runs lie along radial lines.

17. The conveyor of claim 12 in which the guide wheels for the carrier runs and return runs are on staggered radial lines.

18. The conveyor of claim 15 in which the guide means is a plurality of guide wheels, the guide wheels for the carrier runs each having a circular base upon which the belts ride.

19. The conveyor of claim 10 in which the belts are V-belts having a wide surface and a narrow surface joined by sloping sides, the carrier runs of said belts run above the table with the narrow surface as the upper load-engaging surface, and the guide means for said carrier runs has a portion engaging the belts along one of the sloping sides below the upper surface to maintain the belts in engagement with the table.

20. A conveyor for handling unit loads comprising a table extending along the desired path of travel, means for supporting said table, a pair of laterally spaced-apart endless narrow belts operating at substantially the same linear speed to engage the unit loads to be carried and move them along said table, drive means at one end of the conveyor to drive said belts, said drive means including a motor and a pair of drive sheaves driven by said motor and engageable with said belts, each of said sheaves being cantilevered on a drive shaft, and means at the other end of the conveyor to return the belts, said last mentioned means including a pair of idler sheaves engageable with said belts, each of said idler sheaves also being cantilevered on a shaft.

21. The conveyor of claim 20 in which said motor is mounted between said drive sheaves and is directly connected to said sheaves through said drive shafts.

22. The conveyor of claim 20 in which said idler sheaves are adjustably mounted to provide for varying the tension in said belts.

23. The conveyor of claim 21 in which said motor and drive sheaves comprise an assembly that is pivotally mounted about an axis parallel to the drive shafts, and means is provided to releasably hold said assembly up in a position beneath said table.

24. The conveyor of claim 21 in which said idler sheaves comprise an assembly that is mounted for pivotal movement about an axis substantailly parallel to the idler shafts, and means is provided to releasably hold said assembly up in a position beneath said table.

25. A conveyor for handling unit loads comprising a conveyor belt supporting table extending along substantially the entire path of travel of the conveyor and at substantially the desired height of the loads to be conveyed, means for supporting said table at said height, a pair of laterally spaced-apart endless belts operating at substantially the same linear speed with the carrier and return runs of said belts both traveling above the top surface of said table, the top surface of said belts when traveling as the carrier runs being narrower than the widest portion thereof, means to elevate slightly the carrier runs relative to the return runs so that the top surfaces of the carrier runs are above the top surfaces of the return runs, and means to drive and return said endless belts.

26. The conveyor of claim 25 in which said belts are continuously driven through the conveyor while maintaining said belts in an untwisted condition at all times.

27. The conveyor of claim 25 in which said table is a continuous unbroken surface throughout the entire path of travel of the unit loads.

28. A conveyor for handling unit loads and the like comprising a table having a conveyor belt supporting surface extending longitudinally along substantially the entire path of travel and at substantially the height of the loads to be conveyed, an endless flexible belt movable along said path above said surface and having a carrier run adapted to engage and convey unit loads as it travels above said surface and along said path, the remaining part of said belt being the return run, drive means engageable with said belt to cause said belt to move along said path, guide means at the ends of said path to direct said belt along said path and to and from said drive means so that both said carrier run and the portion of said return run between said guide means travel above said surface of said table, and means providing for movement of said portion of said return run along said path above said surface at a different elevation than said carrier run so as not to interfere with the conveying of loads by said carrier run.

29. The conveyor of claim 28 in which said belt is easily flexible in both horizontal and vertical planes.

30. A conveyor for handling unit loads and the like comprising a table having a conveyor belt supporting surface extending longitudinally along substantially the entire path of travel and at substantially the desired height of the loads to be conveyed, a pair of laterally spaced-apart endless flexible belts operating at substantially the same linear speed and movable along said path above said surface, said belts each having a carrier run which runs are adapted to engage and convey unit loads as they travel above said surface and along said path, the remaining part of each of said belts being the return run, drive means engageable with said belts to cause said belts to move along said path, and guide means at the ends of said path to direct said belts along said path and to and from said drive means so that both said carrier runs and the portions of said return runs between said guide means travel above said surface of said table, said portions of said return runs being movable along said path above said surface in a manner not to interfere with the conveying of loads by said carrier runs.

31. A sanitary conveyor for handling unit loads and the like comprising a table having a conveyor belt supporting surface extending longitudinally along substantially the entire path of travel and at substantially the height of the loads to be conveyed, said surface being substantially imperforate along substantially the entire path of travel to prevent foreign matter from passing through the surface and thereby creating an unsanitary condition under said surface, an endless flexible belt movable along said path above said surface and having a carrier run adapted to engage and convey unit loads as it travels above said surface and along said path, the remaining part of said belt being the return run, drive means engageable with said belt to cause said belt to move along said path, guide means at the ends of said path to direct said belt along said path and to and from said guide means so that both said carrier run and the portion of said return run between said guide means travel above said surface of said table, and means providing for movement of said portion of said return run along said path above said surface at a different elevation than said carrier run so as not to interfere with the conveying of loads by said carrier run.

32. The sanitary conveyor of claim 31 in which said belt is easily flexible in both horizontal and vertical planes.

33. A sanitary conveyor for handling unit loads and the like comprising a table having a conveyor belt supporting surface extending longitudinally along substantially the entire path of travel and at substantially the height of the loads to be conveyed, said surface being imperforate along substantially the entire path of travel to prevent foreign matter from passing through the surface and thereby creating an unsanitary condition under said surface, a pair of laterally spaced-apart endless flexible belts operating at substantially the same rate of speed and movable along said path above said surface, said belts each having a carrier run, which runs are adapted to engage and convey unit loads as they travel above said surface and along said path, the remaining part of each of said belts being the return run, drive means engageable with said belts to cause said belts to move along said path, and guide means at the ends of said path to direct said belts along said path and to and from said drive means so that both said carrier runs and the portions of said return runs between said guide means travel above said surface of said table, said portions of said return runs being movable along said path above said surface in a manner not to interfere with the conveying of loads by said carrier runs.

References Cited by the Examiner
UNITED STATES PATENTS

| | | | |
|---|---|---|---|
| 23,878 | 7/1859 | Wood | 198—190 |
| 2,713,412 | 7/1955 | Douglass | 198—190 X |

EVON C. BLUNK, *Primary Examiner.*

E. A. SROKA, *Assistant Examiner.*